United States Patent [19]
Large et al.

[11] Patent Number: 5,751,899
[45] Date of Patent: May 12, 1998

[54] METHOD AND APPARATUS OF ANALYSIS OF SIGNALS FROM NON-STATIONARY PROCESSES POSSESSING TEMPORAL STRUCTURE SUCH AS MUSIC, SPEECH, AND OTHER EVENT SEQUENCES

[76] Inventors: Edward W. Large, 5283 Brandy Oaks La., Columbus, Ohio 43220; John F. Kolen, 2822 Indianola Ave., Columbus, Ohio 43202

[21] Appl. No.: 254,638

[22] Filed: Jun. 8, 1994

[51] Int. Cl.⁶ .................................................. G01L 3/02
[52] U.S. Cl. ................................... 395/2.16; 84/714
[58] Field of Search ........................... 395/2.16, 2.12, 395/2.67, 2.7, 2, 2.09; 381/43, 41; 367/62; 84/600, 652, 704, 714

[56] References Cited

U.S. PATENT DOCUMENTS

| | | | |
|---|---|---|---|
| 3,697,703 | 10/1972 | Calrk, Jr. et al. | 179/1 |
| 4,296,279 | 10/1981 | Stork | 179/1 |
| 4,559,602 | 12/1985 | Bates, Jr. | 364/487 |
| 4,991,487 | 2/1991 | Yamaguchi | 84/714 |
| 5,276,629 | 1/1994 | Reynolds | 364/487 |

OTHER PUBLICATIONS

IEEE transactions on signal processing; Evangelsta, "Pitch–synchronous wavelet representations of speech and music signals", pp. 3313–3330 vol. 41, Dec. 1993.

Allen, P.E., & Dannenberg, R.B. (1989). Tracking Musical Beats in Real Time. In Proceedings of the 1990 International Computer Music Conference (pp. 140–143). Computer Music Association.

Brown, J.C. (1993). Determination of the Meter of Musical Scores by Autocorrelation. *Journal of the Acoustical Society of American*, 94, 1953–1957.

Desain, P., & Honing, H. (1991). The Quantization of Musical Time: a Connectionist Approach. In P.M. Todd and D.G. Loy (Eds), *Music and Connectionism* (pp. 150–160). Cambridge: MIT Press.

Desain, P., & Honing, H. (1992). The Quantization Problem: Traditional and Connectionist Approaches. In M. Balaban, K., Ebcioglu, and O. Laske (Eds), *Understanding Music with AI; Perspectives in Music Cognition* (pp. 448–463). Menlo Park, CA; The AAAI Press.

Longuet–Higgins, H.C., & Lee, C.S. (1982). The Perception of Musical Rhythms. *Proceeding of the Royal Society of London B*, 207, 187–217.

Longuet–Higgins, H.C. (1987). *Mental Processes*. Cambridge: MIT Press. Chapter 10: The Perception of Melodies.

Page, M.P.A. (1993). Modelling Aspects of Music Perception using Self–Organizing Neural Networks. Unpublished doctoral dissertation, University of Cardiff. Chapter 8: Modelling aspects of rhythmic structure.

Rosenthal, D. (1992). Emulation of Human Rhythm Perception. *Computer Music Journal*.

Large, E.W. (1994). Dynamic Representation of Musical Structure. Unpublished doctoral dissertation, The Ohio State University.

*Primary Examiner*—Allen R. MacDonald
*Assistant Examiner*—Richemond Dorvil
*Attorney, Agent, or Firm*—Porter, Wright Morris & Arthur

[57] ABSTRACT

A method and apparatus for the analysis of a non-stationary signal to determine the presence of pseudo-periodic components in the signal. The present invention possesses a memory for recent events, displays expectations for upcoming events, and can handle missing events at those times. The apparatus ignores events which should not effect its prediction. These properties are achieved by driving one or more nonlinear oscillators with an input signal, causing a subset of the oscillators to entrain to pseudo-periodic components of the input signal. When incoming events fall within one of the pulses produced by a nonlinear oscillator, the nonlinear oscillator adjusts it phase and/or period to synchronize with the input signal.

43 Claims, 12 Drawing Sheets

METHOD AND APPARATUS OF ANALYSIS OF SIGNALS FROM NON-STATIONARY PROCESSES POSSESSING TEMPORAL STRUCTURE SUCH AS MUSIC, SPEECH, AND OTHER EVENT SEQUENCES

FIELD OF THE INVENTION

The present invention generally relates to a method of analysis for determining the temporal structure of signals composed of discrete events from a non-stationary source and specifically relates to a mechanism for identifying temporal structure in music, speech, and other event train generators.

BACKGROUND OF THE INVENTION

The term rhythm, or rhythmic pattern, refers to a time-series of events. Some rhythms, such as those underlying music and speech signals, are structured in very specific ways over time. We refer to the form of temporal organization underlying these rhythms as metrical structure. A metrically structured rhythm can be thought of as a rhythm that is generated by a coordinated set of nearly periodic signal generators. The periods of the individual signal generators a may change, however certain relationships between signal generators remain relatively invariant over time. Metrical structure is a set of observed, or perceived, relationships between (assumed) signal generators. The problem of metrical structure is to identify components of the signal corresponding to individual signal generators, and to identify and track relationships (relative phases and periods) of the signal generators, in real time.

Metrically structured rhythms are composed of several not-quite-periodic components, called pseudo-periodic components, each corresponding to an individual signal generator. A pseudo-periodic component corresponds to the output of a signal generator over time, and is composed of individual events. A component is pseudo-periodic because it arises from a non-stationary source—the period of its generator changes over time. There are other deviations from periodicity that complicate matters as well, described below.

Music provides a good example of metrically structured rhythms. When one taps one's foot along while listening to music, one is following a single pseudo-periodic component in the musical rhythm. The brain is synchronizing an internal oscillator to a perceived external signal generator. We refer to the periodicity corresponding to the internal oscillator as a level of beats. In general, when one listens to music or to speech, one perceives beats on many different levels, or time-scales. Metrical structures are relative phase and period relationships between levels of beats that remain relatively invariant even as absolute phases and periods of the oscillators vary.

The goal of this invention is to synchronize a coordinated set of nonlinear oscillators with an external rhythm. This will enable marking the signal in real-time by synchronizing events to the rhythm. Such events may have auditory, visual, and/or tactile components such as tapping along with a tune. It will also enable marking the signal off-line for further analysis. This would be useful, for example, in music transcription and speech recognition, which require recognition and analysis of temporal patterns at various time scales.

The ability to track a pseudo-periodic component and recover metrical structure is a fundamental human cognitive/perceptual ability. It enables relatively simple behaviors including tapping along with a tune, and extraordinarily complex behaviors including the ability of skilled musicians to coordinate intricate motor programs with perceived musical rhythms. The ability to synchronize a coordinated set of internal oscillators to an external rhythm enables other behaviors as well. It enables temporal pattern recognition independent of absolute presentation rate, while retaining sensitivity to relative timing—important in many tasks including speech recognition. The synchronization of internal oscillators to external events also enables a wide variety of tasks that involve time-series prediction. In time-series prediction, one must predict not only what event will happen next, one also when future events will occur. If artificial mechanisms were able to mimic this basic human capacity, tasks that could be automated as a result include fluent speech recognition, synchronization of musical accompaniment with human performers, and transcription of performed music. Other potential applications include robotics, DNA sequencing, and time-series prediction.

The Problems with Metrical Structure Analysis

The first problem of metrical structure analysis is tracking a pseudo-periodic component. One reason for this difficulty is that each component arises from a non-stationary processes. A secondary problem is that processes may not produce events in every cycle, but only in some cycles. Finally, a rather severe complication is introduced by the fact that there may be several pseudo-periodic components in the input at the same time, from which individual components must be identified.

A second problem is posed by structural analysis—the identification of relationships between pseudo-periodic components. Simple rhythms have hierarchical structure, and such structures can be recovered (at least for stationary signals) by well-known algorithms. A temporal structure is hierarchical if the periods of two any components have integer ratios, ratios of the form N:1 (e.g. 2:1, 3:1, 4:1, ...). Hierarchical structures characterize rhythmically simple music and speech, but fail to describe all forms of music or the variety of other signals that we can describe as having metrical structure. When a rhythm displays period ratios of the form N:M (M not equal to 1, e.g. 3:2, 4:3, 5:4, ...) we say that it is polyrhythmic. Polyrhythms can be observed in most forms of music and in natural speech. Polyrhythmic structures cannot be adequately characterized as hierarchical nestings. It is more general to think of metrically structured rhythms in general as being composed of pseudo-periodic components at different time scales. We refer a metrical structure as being composed of levels of beats. Traditional information processing techniques can not be easily adapted to handle the complex metrical structures that arise from polyrhythmic signals.

Previous Approaches

Because of its usefulness in engineering problems of this general type, we first describe the potential application of a popular engineering tool—the Fourier analysis—to this problem. To our knowledge, no one has actually proposed it as a solution to this problem, but brief consideration of its (non)applicability may be illustrative. Fourier analysis does a good job of identifying components of a signal whose phase period are fixed, or stationary. One may even presume that a stochastic source (i.e. a random variable with some probability distribution) governs deviations from a given fixed generator, and Fourier analysis will produce good results: if the phase and period of the signal vary according to a fixed distribution there is still a central tendency for the spectral analysis to identify. However, metrically structured rhythms differ from stationary signals in that we can not assume a fixed model of their generation. Neither can we assume a stochastic source, because in most cases timing deviations are systematic and actually carry information, such as expressive timing in music and phrase final lengthening in speech. For example, a pseudo-periodic component may have a slowly increasing period. In this case, although time-varying spectral analysis would produce a non-horizontal line (for the single level), a mechanism for identifying pseudo-periodic components occurring in fixed relationships would require an extra step of pattern recognition to both identify the levels and their relationships. The problem with this approach is that for even moderately complex rhythms the pattern recognition step may be as difficult as the original problem.

As discussed above, there are two main problems that are beyond the current technology. The first is dealing with the non-stationary nature of individual components. The second is the recovery of the structured relationship between components. Proposed solutions to the recovery of metrical structure often break along this line as well—as individual researchers focus upon different aspects of the problem. We briefly discuss important engineering solutions that have been proposed for various aspects of the problem as we have defined it.

Quantization and Time-Warping

As we alluded to above, well-known information processing and signal processing techniques may be applied to certain rhythms to recover metrical structure if presented with a stationary signal as input. Quite a bit of work has been done with preprocessing a signal, cleaning up messy timing data, so that techniques designed for stationary input may be applied. Such approaches are usually referred to as quantization approaches or time-warping approaches. The simplest approach to quantization is to do it by hand. Commercial music software performs quantization through user interaction. Typically, the music is performed to a computer generated metronome click, marking the "ideal" (stationary) temporal location of some intermediate level of beats. The input is then quantized by aligning performed onsets with a temporal grid, adjusted by the user to correspond to the "ideal" inter-event durations present in the performance. In such applications, the end result is typically intended to be a transcription of the performance. There are two difficulties with this approach. The first is that the performance must be synchronized with a stationary, computer-generated event train, or "click track". This is problematic for certain types of music in which timing deviations represent an important part of the musical content. A second difficulty is the user interaction step, which for rhythmically complex music can be a time-consuming process.

One way to approach the first problem is to allow the musician to tap the beat. The musician provides a non-stationary click track that the machine can use to time-warp the performed rhythm. This technique represents the current state-of-the-art in computer music applications. By comparing the non-stationary click track to an "ideal" stationary click track, the machine can (theoretically) calculate the amount of local timing deviation and remove the deviation from the signal to facilitate further processing. This basic approach can be used in machine transcription and machine accompaniment applications. A disadvantage of this technique is that the relationship of the click track to the pseudo-periodic components that comprise the rhythm must still be inferred. Therefore this technique does not solve the user interaction problem described above. In fact, since there is no guarantee that the user supplied click-track will be consistently well coordinated with the rhythm, it may even complicate the user-interaction step.

What enables the previous technique is that the machine has a separate signal whose intended, or canonical, timing relationships are known in advance. This is a fairly strong assumption. However, if application constraints allow, even stronger assumptions can be made. For example, if the only purpose of the machine is sequence recognition, it may be assumed that the entire signal is known in advance. This approach is common in speech recognition. We restrict our attention to one such approach—called dynamic time-warping. In this approach, the sequence to be recognized (usually a word or a short phrase) is represented as a sequence of segments. Using a well-known approach called dynamic programming the machine calculates the optimal (rate-invariant) match between the segments of the canonical signal and segments of the input signal. This approach is useful for sequence recognition. A disadvantage is that the technique is not well-suited to preserving sensitivity to relative timing relationships, which are important in many applications including speech recognition. A second disadvantage is that the machine must know each sequence in advance and perform a separate matching procedure for each sequence to be recognized, limiting the practical utility of this technique.

The final approach to quantization that we will consider is due to Desain & Honing (1991). Desain and Honing developed a connectionist quantizer to "clean up" messy timing data in music so that the metrical structure may be inferred. From their point of view, the relevant task is one of inferring from the inter-event time intervals in the signal the ideal, or intended, inter-event intervals. Using a constraint-relaxation technique the quantizer works on a window of intervals to adjust inter-event durations so that every pair of durations in the window is adjusted toward an integer ratio, if it is already close to one. The main advantage of this technique is the relatively weak assumptions that are made about the nature of the input rhythm. A disadvantage is that even these relatively weak assumptions are too strong to represent a general solution. Polyrhythms common in music and speech are not susceptible to this approach. A second disadvantage is that the algorithm is inefficient, and thus of questionable utility for real-time analysis. A further disadvantage is that it works on a fixed-size input window, whose size must be adjusted depending upon the nature of the input.

Structural Analysis of Stationary Signals

There are a number of possible methods of recovering the structure of rhythms, assuming a stationary signal. Given this assumption, it is worthwhile to reconsider Fourier analysis. Fourier analysis will provide a phase and frequency analysis of the signal, however, there are still problems. The first is that it is a static form of analysis, so that it is not well-suited to the analysis of rhythmic signals in real-time. Secondly, it provides no mechanism for recognizing structure. This would require a pattern recognition step, which, although simplified by the assumption of stationary input, may still be quite difficult. Finally, Fourier analysis assumes periodic components that literally add to recreate the signal. This is not true of events that combine to make up metrically structured rhythms, as we describe below. For this reason Fourier analysis may introduce extraneous frequency components in the analysis that complicate the pattern recognition process.

One method of structural analysis that has been proposed by a number of researchers is to parse the rhythm according to a context-free grammar. A set of rules is constructed that describes allowable temporal structures, and well-known algorithms use the rules to identify the structure in the input. An advantage of this approach is that the analysis implicitly performs structure recognition. In addition, parsing can be done in real-time—at least in principle. A disadvantage is that real-time parsing may require either backtracking or simultaneous consideration of multiple alternative structures, and both strategies hamper efficient processing. A second disadvantage is that parsing methods apply efficiently only to hierarchical metrical structures (N:1 structure, as described above). This method has never been applied to parse more complex forms of metrical structures (i.e. polyrhythms), because it would be grossly inefficient.

Dynamic Processing of Input Rhythms

In some situations it is important to be able to process signals on-line, with only local information. Such approaches are sometimes called beat-tracking approaches. From the perspective we have outlined above, the idea of beat-tracking is to synchronize an internal signal generator (generating beats) with an external signal generator (generating events in the signal). The invention we disclose below could be thought of as a beat-tracking device. The main difference between our approach and previous approaches is simply that previous attempts at beat-tracking have not been successful. The invention described in the next section, based on entrainment of a non-linear oscillator to an external signal, solves the beat-tracking problem.

A number of alternative approaches to the problem of beat tracking have been proposed (Allen & Dannenberg, 1989); (Dannenberg, 1984); (Dannenberg & Mont-Reynaud, 1987); we will not describe each in detail here. In general, however, the approach assumes that the period of the pseudo-periodic component (to use our terminology) is not static. The length of the internal beat-period is adjusted throughout the rhythm as the component speeds up or slows down. Although a number of mechanisms have been proposed to track events in live performance, none have proved successful enough to be useful in practical application (Allen & Dannenberg, 1989). One problem with this approach may be that usually only a single pseudo-periodic component is tracked. However, the central problem seems to be that previous attempts at beat-tracking seriously underestimated the dynamic complexity of the task. Simple strategies were tried, but the resulting behavior was unstable.

Longuet-Higgins (1987) proposed a hybrid method that combines beat-tracking with metrical structure parsing. The program uses a static tolerance window, within which it will treat any event as being "on the beat". Events which fall outside the window are interpreted as subdividing the beat (either into groups of two or three—i.e. hierarchical metrical structures). This approach may solve some of the problems inherent in tracking a single component, because separate components are tracked by separate levels of beats, reducing the potential for confusion in the tracking mechanism. However, results reported to date do not indicate practical success at solving the beat-tracking problem. In addition, this approach suffers from the problems of metrical structure parsing, including the inability to handle polyrhythmic structure and the potential for inefficiency in ambiguous situations.

Page (1994) suggests that a mechanism for beat tracking should operate analogously to a phase-locked loop (PLL), an electronic circuit commonly used in communications applications. Although standard PLL designs produce synchronization with simple signals, the standard PLL is not an acceptable solution to the problem of beat-tracking. Page's simulations detail the many difficulties associated with the PLL approach. Most importantly, the typical PLL design strongly assumes periodic input signals. This assumption seriously limits the circuits's ability to deal with the complex rhythmic structures of music and speech. The main reason is that the PLL reacts to every input event. Thus a PLL is not able to identify individual pseudo-periodic components within a complex rhythmic pattern. One way to get around this problem is to assume that one pseudo-periodic component is unambiguously identifiable in the signal. This can be accomplished in practice by assigning a priority channel to a component that is known to be periodic (in the ideal) and synchronized with the input rhythm (a musician taps the beat—a click track—on this channel). Such a strategy is used in some commercial music accompaniment systems. A disadvantage of this work-around is that it is simply a real-time implementation of a time-warping strategy mentioned above, and suffers from the same problems. A second disadvantage is that in actual musical performance (and certainly in speech recognition) it may be an unwanted burden to explicitly tap a click-track, and for some music even when this is done the results may be unacceptable.

In summary, the difficulty of identifying metrical structure in real-world signals arises from timing variability (non-stationarity), missing events, extraneous events, and structural complexity. Without these difficulties, metrical analysis could be performed by the methods described above. A successful mechanism must have the ability to "pick" pseudo-periodic components out of a complex rhythmic pattern in spite of missing, ambiguous, or misleading information, and combine these components into complex structures. We have developed such a mechanism.

SUMMARY OF THE INVENTION

This invention provides a method for analyzing metrically structured rhythms that avoids the pitfalls described above. The mechanism works on-line with local information. It possesses a memory for recent events, displays expectations for upcoming events, and can even handle missing events at those times. The mechanism can ignore events that should not affect its behavior.

These properties are achieved by entraining, or synchronizing, a nonlinear oscillator to the incoming signal. The nonlinear oscillator produces pulses with a given phase, period, and width. When incoming signals fall within one of these pulses, the nonlinear oscillator will adjust its phase and/or period to synchronize with the input event. The pulse function prevents intervening events from distracting the oscillator, because the oscillator will ignore events that fall outside of its pulses (Events that fall outside the pulses of one oscillator are assumed to mark other levels). A number of nonlinear oscillators can be used to recover the metrical structure of input signals. Different non-linear oscillators track different pseudo-periodic components, and can be coupled such that coupling among nonlinear oscillators places constraints on the type of analysis that is performed.

The present invention is a method and apparatus for the analysis of a non-stationary signal to determine the presence of a non-stationary component in the signal. A signal is provided as a time-series susceptible to phase and frequency analysis. A nonlinear oscillator having (potentially) non-stationary output is also provided, and the state variables of the oscillator can be adjusted throughout the time during which the signal is provided. The state variables of the nonlinear oscillator are adjusted throughout the time during which the input signal is provided, said state variables determining at least one of the group consisting of phase, period and gain, to reflect the phase, period and variability of a pseudo-periodic component in the signal. The present invention may also include multiple nonlinear oscillators, each having (potentially) non-stationary output. In this embodiment, the signal is compared with the phase, period, and gain of the output of the multiple oscillators as the state variables of the oscillators change.

The present invention will be better understood from the following description of the drawings and detailed description of the preferred embodiments.

Figure 1A:
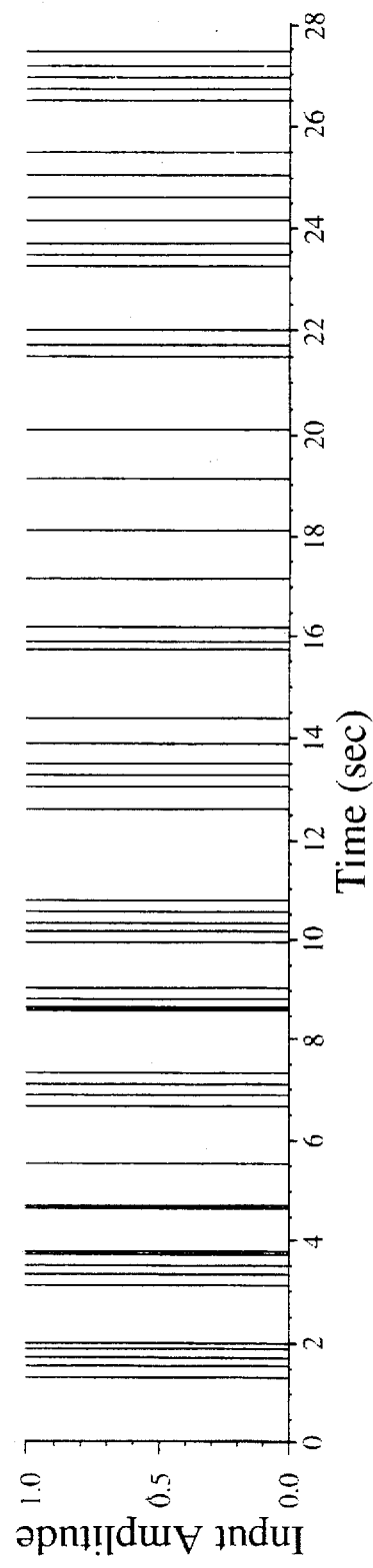
FIGS. 1A and 1B illustrate two examples of event trains derived from different sources.

DESCRIPTION OF THE PREFERRED
EMBODIMENT(S)

In this section, we present a entrainment method for tracking a pseudo-periodic component in a rhythmic signal. The method involves coupling one or more nonlinear oscillators to an external rhythmic signal. The coupling entrains the internal nonlinear oscillator to a pseudo-periodic component in the signal. We briefly reiterate and expand upon earlier definitions.

We assume that events in the input signal are generated by a coordinated set of oscillatory (but not necessarily stationary) signal generators. We assume that each external signal generator may generate an event at the beginning of its cycle, and we define the phase at this event to be 0. The subset of events that corresponds to the output of a single signal generator over time is a pseudo-periodic component. We further assume that when two signal generators generate events simultaneously, only a single event may be observed in the input signal. Another way to say this is that external signal generators may not necessarily generate events at the beginning of every cycle. The upshot is that a single event may participate in more than one component—and it may not be possible to tell from the event's amplitude how many components the event participates in.

Next, one or more nonlinear oscillators are driven by the complex input signal. By nonlinear oscillator we mean a structurally stable dynamical system that exhibits a unique asymptotically stable limit cycle. The most common examples of a nonlinear oscillators are the van der Pol oscillator and the Duffing oscillator (see for example, Rand, Cohen & Holmes, 1988, Wiggins, 1980 and Glass & Mackey, 1988). A nonlinear oscillator exhibits stable periodic behavior (called a "limit cycle") and when driven by an external periodic process it entrains, or synchronizes, to that process. Nonlinear oscillators may be expressed as sets of coupled differential equations or finite difference equations defined over a state space, i.e. a set of state variables (e.g. Wiggins, 1980). Depending upon the specific type of nonlinear oscillator, the state variables may correspond to various measurable physical properties. When the nature of the physical processes that give rise to the limit cycle are not measurable, or are not essential to the process being modeled (as in our case), then an approximation called a limit cycle oscillator is often employed (e.g. Rand, Cohen & Holmes, 1988). This permits specification of the state of the oscillator by a single state variable, called phase, $\phi$, where $\phi(t)$ represents the position of the oscillator around its limit cycle at time t. Phase of the oscillator is a single variable which realistically reflects the behavior of the most important physical variables that underlie the oscillation.

A discrete approximation to a nonlinear oscillator, capable of capturing the essential behavior of a nonlinear oscillator as it entrains to a periodic process, is called a circle map (also called a Poincare map, see Wiggins, 1980). Circle maps can be derived directly from the equations for nonlinear oscillators or driven nonlinear oscillators (e.g. Wiggins, 1980, Glass & Mackey, 1989). The advantages of describing the behavior of a driven nonlinear oscillator using a discrete circle map are: 1) Dimensional reduction: A circle map reduces the number of state variables in the description, 2) Global dynamics: Numerically computed circle maps provide insightful displays of the global dynamics of the system (see Large, 1994 or Large & Kolen, 1994 for displays that describe the global dynamics of the circle map described below), and 3) Conceptual clarity: Concepts that are cumbersome to state for differential equations may be succinctly stated for the associated circle map (Wiggins, 1980).

For these reasons, this invention is formulated as a discrete circle map. Typically, a circle map that describes the behavior of a driven nonlinear oscillator is formulated in terms of relative phase, the phase of a driving oscillator at which the driven oscillator "fires", or reaches phase 0 (e.g. Glass & Mackey, 1988).This invention is described as a special type of circle map. First, it does not assume a periodic driver, but simulates the effect of a complex driving signal (i.e. one composed of multiple pseudo-periodic components) on a nonlinear oscillator. In addition, it describes the phase of the driven oscillator at which an event occurs in the input signal (the reverse of the normal simulation). Second period, p, is also considered as a state variable, so that the circle map simulates a nonlinear oscillator whose period adapts to reflect changes in the nature of the input signal. Finally, a third state variable, called gain, γ, is defined. This state variable describes limits on the phase of the oscillator during which an external signal can affect the behavior (i.e. the internal state variables) of the driven oscillator. This allows the simulated oscillator to adapt to the variability in a particular pseudo-periodic component of the input signal, while ignoring other pseudo-periodic components.

Let each cycle of the oscillation have intrinsic period p. We then define the phase at any time $0<t<p$ to be $\phi(t)=t/p$. As we define it here, phase lies between 0 and 1. Two oscillations are synchronized when they regularly come into phase, or begin their cycles together. A process by which two or more oscillators achieve synchronization is called entrainment. Entrainment occurs because a coupling between two or more oscillations causes them to synchronize. Coupling allows a signal (the driver) to perturb an oscillator (the driven) by altering the values of its state variables. According to this invention, a rhythmic pattern serves as the driver, and perturbs the state variables of a driven oscillator, causing a change to the oscillator's behavior. The oscillator adjusts its phase and period only at certain times during its cycle, allowing it to isolate a single pseudo-periodic component in the incoming rhythm. We give two examples of simulated nonlinear oscillators responding to complex rhythmic patterns. Networks of nonlinear oscillators may be composed to perform analyses of metrically structured rhythmic patterns. The designs of such networks are domain-specific.

The Signal

Figure 1B:
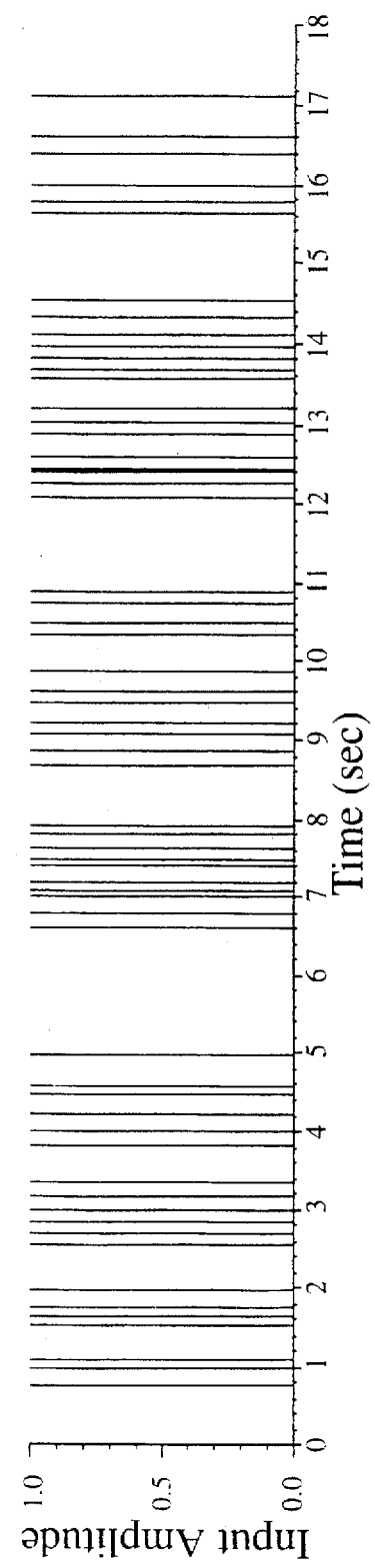

The input signal consists of a series of events s(t). We refer to the signal as a time-series however this method of analysis applies equally well when the signal is non-temporal. Such a series of events may be recovered from a variety of sources. FIG. 1 gives two examples of event trains derived from different sources. FIG. 1A shows a series of events collected on a computer-monitored piano via MIDI (Musical Instrument Digital Interface). The source is was an improvised piano melody. FIG. 1B shows a series of events derived using an edge detection algorithm applied to a digitally sampled acoustic signal. The source was read speech. The series itself may be stationary or non-stationary. In FIG. 1, s(t)=1 when an event occurs, and s(t)=0 at other times. In general, s(t) may take on any value, and it is often useful to let the value of s(t) carry information such as amplitude.

The Nonlinear Oscillator

Discrete Simulation of a Driven Nonlinear Oscillator

As described above, phase entrainment of a nonlinear oscillator can be simulated using a type of finite difference equation called a circle map (Glass & Mackey, 1988, Large, 1994). A typical circle map describes phase entrainment of a nonlinear oscillator to a simple periodic input signal. Given relative phase, $\phi_i$, the ratio of input period to oscillator period, q/p, and a nonlinear phase coupling term, $f(\phi_i)$, the map calculates the relative phase of the next event, $\phi_{i+1}$:

$$\phi_{i+1}=\phi_i+q/p+\eta_1 f(\phi_i, \gamma_i). \tag{1}$$

The coupling term captures the alteration of phase brought about by the $i^{th}$ input event and the coupling strength, $\eta_1$, describes the amount of influence that the driver has upon the nonlinear oscillator. The prototypical circle map assumes the simplest case of an input signal, namely that of a single periodic component whose period is known in advance. In the current invention, period is not known in advance, however. Rather it is to be estimated by the oscillator. In addition, input signal will usually consist of more than a single pseudoperiodic component. Thus, because input signals are nonstationary, multifrequency patterns, we describe phase entrainment using a finite difference equation in the variable $t_x$.

$$t_{xi+1}=t_{xi}+\eta_1 p f(\phi_i, \gamma_i), \; t_x \leq t < t_x+p, \tag{2}$$

or we use a form similar to Equation 1, but change the ratio term $$\phi_{i+1} = \phi_i + \frac{t_{i+1} - t_i}{p_{i+1}} + \eta_4 f(\phi_i, \gamma_i) \, mod1 \tag{3}$$

These equivalent finite difference equations describe absolute phase of the oscillator (Equation 2), or the of relative phase of the next event (Equation 3) in the input signal. Here $t_{xi}$ is related to $\phi_i$ as described above. Thus, either is appropriate for describing the entrainment of a nonlinear oscillator to an input signal composed of multiple components whose frequencies are not known in advance. Below, we describe an algorithm using the first type of finite difference equation (Equation 2); because it is based on absolute phase, it parsimoniously captures the generation of a discrete reference periodicity in real-time.

To predict upcoming events in a nonstationary signal, the oscillator also adapts its intrinsic period to accommodate various changes occurring throughout the event. Adaptation of period can be described using a difference equation that estimates the period of the next event, $P_{i+1}$, on the basis of the current oscillator period, $p_i$:

$$p_{i+1}=p_i+\eta_2 p f(\phi_i, \gamma_i), \tag{4}$$

In addition, the oscillator also adapts a state variable called gain, γ, to estimate variability in the current component.

$$\gamma_{i+1} = (\gamma_i + \eta_3 g(\phi_i, \gamma_i))e^{\eta_{3r}\frac{(t_{i+1}-t_i)}{p_i}}. \tag{5}$$

Next we give examples of how to define the functions $f(\phi_i, \gamma_i)$ and $g(\phi_i, \gamma_i)$.

Reference Periodicities

The oscillator generates a reference periodicity, and adjusts its phase and period so that entrains to a single pseudo-periodic component in the signal. Let t be time, and define $t_x$ to be the time of next expected event. When time, t, reaches the time of the next expected pulse, $t_x$ (i.e. when $t=t_x$, and phase is 0), $t_x$ is reset in anticipation of the next event, such that $t_x=t_x+p$. At this time the oscillator can produce a discrete output signal, called a beat. The sequence of beats generated by the oscillator is one type of reference periodicity.

The oscillator can produce a second kind of reference periodicity, called a pulse. A pulse is like a beat except that it is defined in a continuous fashion, so that it has a width, an extent in time. According to the above definitions, $$\phi(t) = \frac{t_x - t}{p}$$

gives the current phase of the nonlinear oscillator. Then a pulse can be defined by a function such as:

$$o(t)=1+\tanh\gamma(\cos 2\pi\phi(t)-1) \tag{6}$$

where γ is the output gain.

Figure 2A:
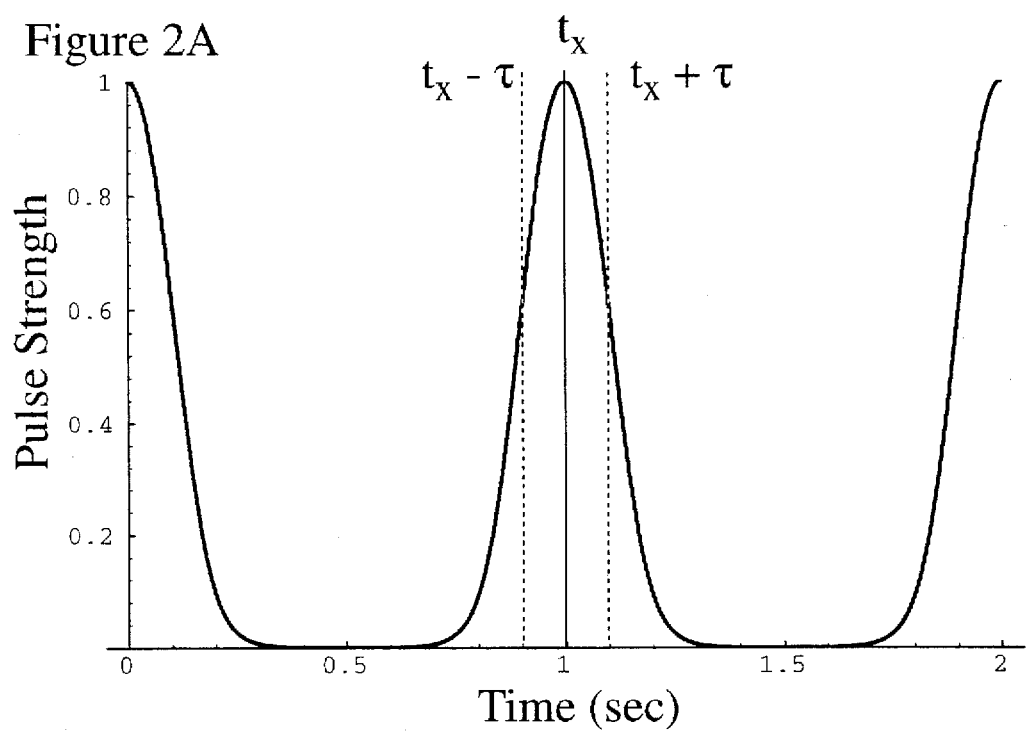
FIGS. 2A and 2B illustrate pulse functions (temporal receptive fields) for two different values of $\tau$. A) $\tau=0.10$. B) $\tau=0.05$. $\tau$ describes the amount of variability that the oscillator will tolerate in the period of the components being tracked.
Figure 2B:
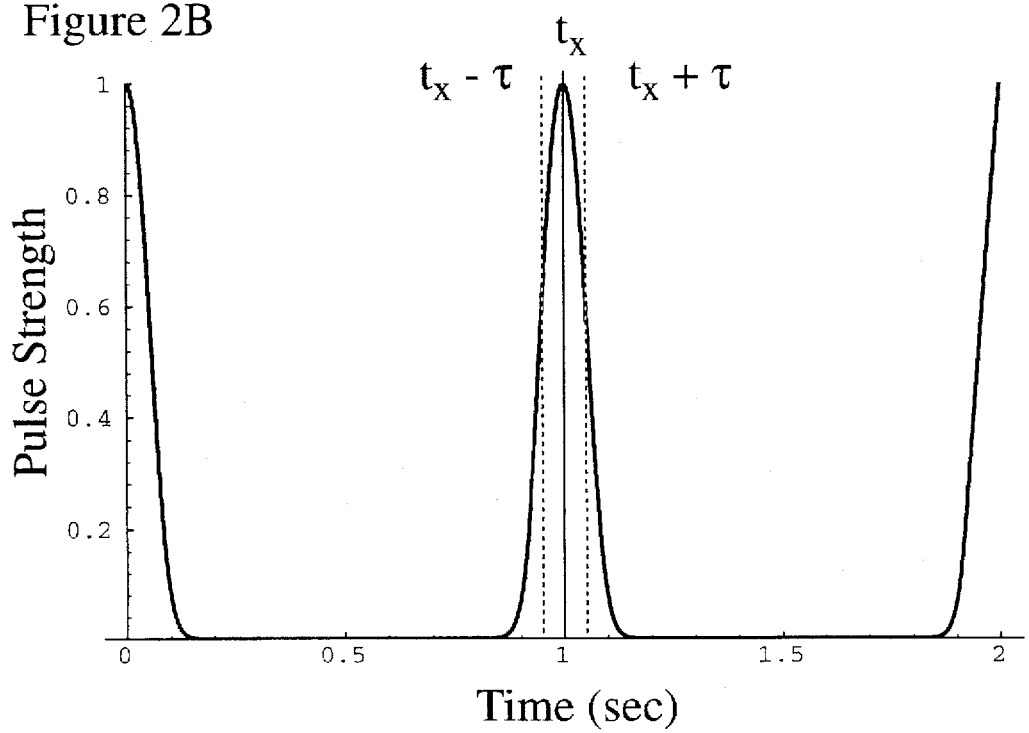

FIG. 2 shows a pulse, in the absence of input, as a function of time. Pulse strength is maximum (o(t)=1) at the beginning of each cycle (i.e. when t=$t_x$, phase is 0), quickly falls to zero for the body of the cycle, then begins to rise again to a maximum as the cycle comes to a close. The pulse function is only non-zero for a relatively small portion of the cycle. A pulse defines a temporal receptive field for the oscillator, a region of temporal "expectancy". The oscillator entrains to the signal by adjusting its state variables only in response to events that occur within this receptive field; it ignores events that occur outside of this field. This is an important departure from phase-locked loop models, as described above. This innovation allows the oscillator to track a single pseudo-periodic component in an unknown signal, while ignoring irrelevant information (other events, which would be tracked by other oscillators, as described below).

The parameter γ, the output gain, determines the size of the receptive field. When γ is small, (FIG. 2A), the receptive field is wide and the oscillator will tolerate a relatively large amount of variability in the phase and period of the component being tracked. When γ is large, (FIG. 2B), the region is narrow and the oscillator will tolerate relatively little variability in the phase and period of the component being tracked.

In order to deal with non-stationary signals, the oscillator adjusts the size of its receptive field as it entrains to the signal. Once the oscillator has entrained, the value of γ acts as a measure of the variability of the component being tracked. Because this measure is somewhat non-standard, we introduce a second, related measure, called π. Let $t_x$ be the time at which the oscillator (maximally) expects the next event, then τ is a measure of deviation from this time (as a percentage of the current beat-period) that the oscillator will tolerate, and still adjust its phase and period to efficiently track the pseudo-periodic component. τ is related to γ as follows:

$$\gamma = \frac{\omega}{\cos 2\pi\tau - 1}. \quad (7)$$

In this equation, ω is a constant, ω=−0.416. In what follows, we refer to τ rather than to γ.

Phase Entrainment

To implement phase entrainment, one defines the function $f(\phi_i, \gamma_i)$ (see Equation 2) similarly to:

$$f(\phi_i, \gamma_i) = \frac{1}{2\pi} \operatorname{sech}^2\gamma_i(\cos 2\pi\phi_i(t) - 1)\sin 2\pi\phi_i(t), \quad (8)$$

Figure 3A:
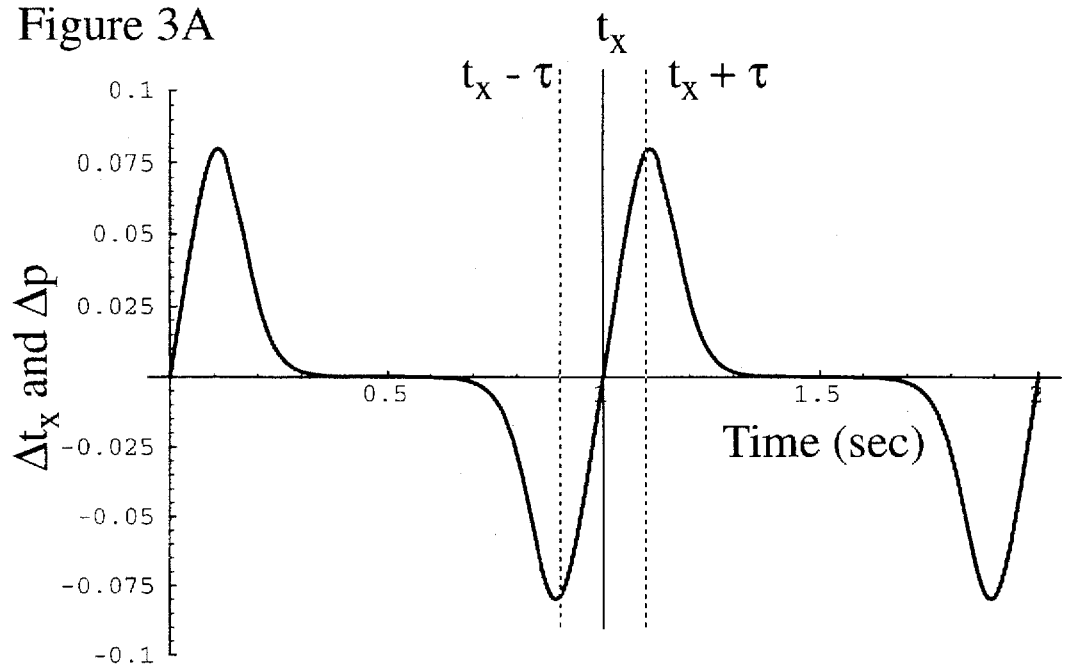
FIGS. 3A and 3B illustrate the effect of the coupling function for phase and period (see Equation 8 and Equation 9, both have the same shape), for two different values of $\tau$. A) $\tau=0.10$. B) $\tau=0.05$. This figure illustrates how $\tau$ describes the amount of variability that the oscillator will tolerate in the period of the component being tracked.
Figure 3B:
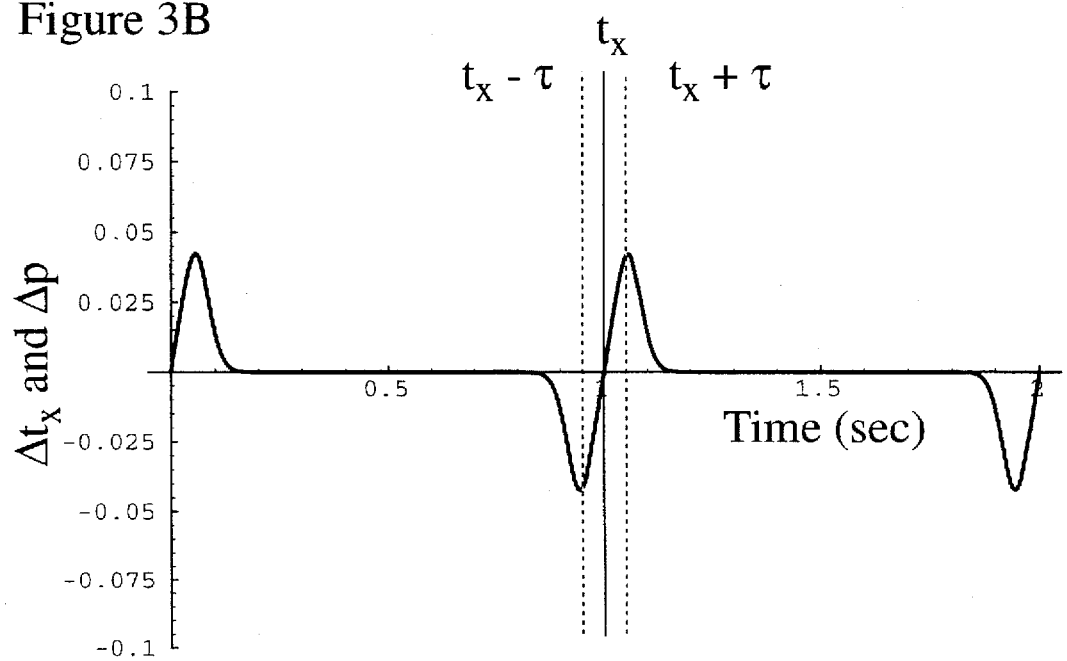

One can add s(t) as a multiplicative factor in this formula ensuring that the coupling function will have a non-zero value only when a event occurs. FIG. 3 shows the shape of this curve, summarizing the effect of coupling in relation to the pulse function. An event that occurs within the oscillator's temporal receptive field, but before $t_x$ causes a negative phase shift, because $\Delta t_x$<0. An event after $t_x$ causes a positive phase shift, because $\Delta t_x$>0. Thus, this is a non-linear coupling term implementing phase entrainment. Note that phase entrainment is most efficient when $|t_x-t|\leq\tau$. When, $|t_x-t|>\tau$ the adjustment to $t_x$ is less than would be necessary to entrain oscillator to the signal. If $|t_x-t|$ is large enough, the oscillator will ignore the event. This occurs because of the way in which gain, γ, is used in the coupling function. If $|t_x-t|>\tau$ for several cycles, the oscillator will lose the signal. This is the reason we allow the oscillators to adjust τ, described below.

Period-Tracking

We achieve period-tracking behavior by noting that the difference between expected and observed period is the same as the difference between expected and observed event times (assuming the unit was in phase in the last cycle). Therefore, we use the same coupling function, except that we use a different coupling term, $\eta_2$ (see Equation 4):

$$f(\phi_i, \gamma_i) = \frac{1}{2\pi} \operatorname{sech}^2\gamma_i(\cos 2\pi\phi_i(t) - 1)\sin 2\pi\phi_i(t), \quad (9)$$

The use of a separate coupling term allows separate fine tuning of the phase entrainment and period-tracking behaviors. Aside from this difference, the rules are identical. Again, One can add s(t) as a multiplicative factor in this formula ensuring that the coupling function will have a non-zero value only when an event occurs. FIG. 3 also shows the shape of this curve, summarizing the effect of the delta rule in relation to the pulse function. An event that occurs within the oscillator's receptive field, but before $t_x$ causes a negative adjustment to period, because Δp<0. An event after $t_x$ causes a positive adjustment to period, because Δp>0. Thus, this is a non-linear coupling term implementing period-tracking behavior. As above, period tracking is most efficient when $|t_x-t|\leq\tau$, and if $|t_x-t|$ is large enough, the oscillator will ignore the event.

Estimating the Variability of the Current Component

It is useful to allow the oscillator to adapt τ. This allows the oscillator to adjust the size of its temporal receptive field, depending on the amount of variability in the input signal. In effect, we use this adjustment is to estimate the variability of the phase and period of the component to which the oscillator is responding. In order to do this, we limit τ to a fixed range between $\tau_{min}$ and $\tau_{max}$ by introducing the control parameter Ω, which is related to τ by:

$$\tau=\tau_{max}+0.5(\tau_{min}-\tau_{max})(1+\tanh\Omega). \quad (10)$$

Figure 4:
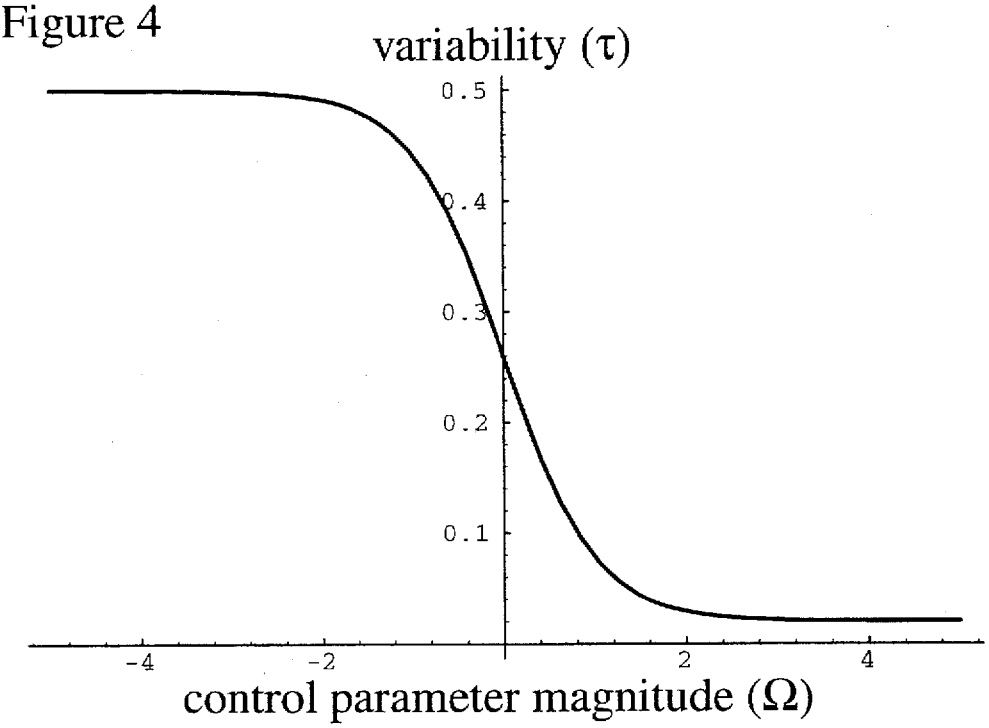
FIG. 4 illustrates the relationship between $\Omega$ and $\tau$, according to Equation 10.

FIG. 4 shows this relationship. We then use the following adjustment to Ω:

$$\Delta\Omega=\eta_3 s(t)\operatorname{sech}^2\gamma(\cos 2\pi\phi(t)-1)(\cos 2\pi\phi(t)+2\gamma\tanh\gamma(\cos 2\pi\phi(t)-1)\sin^2 2\pi\phi(t)). \quad (11)$$

Figure 5A:
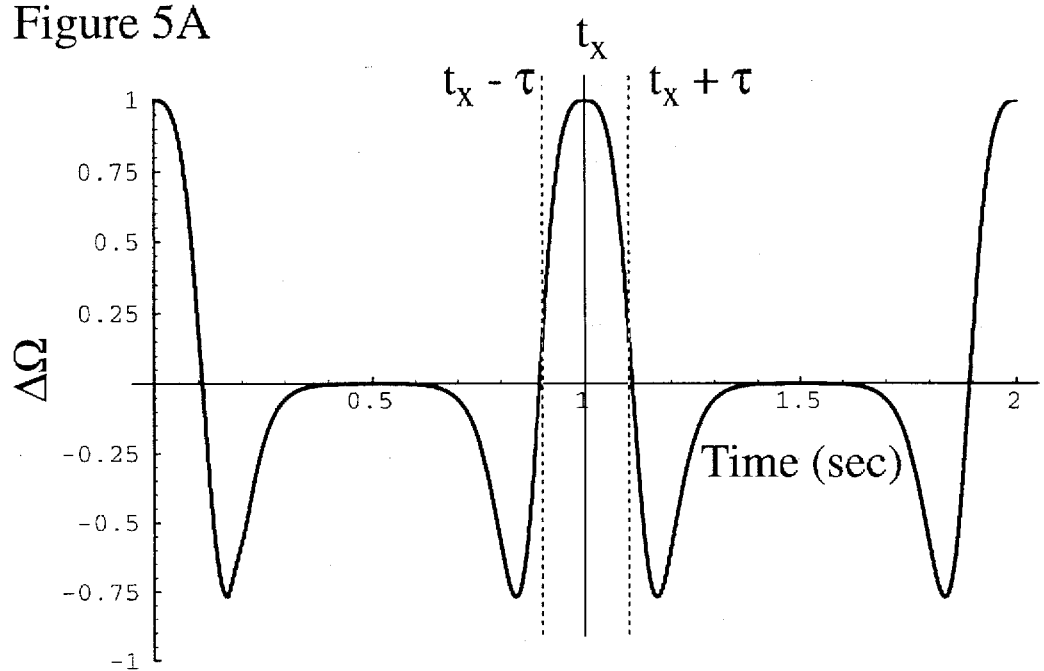
FIGS. 5A and 5B illustrate the effect of the adjustments to variability ($\tau$) given in Equation 11, for two different values of $\tau$. A) $\tau=0.10$. B) $\tau=0.05$. The y-axis gives $\Delta\Omega$ values, and $\tau$ and $\gamma$ are calculated from $\Omega$.
Figure 5B:
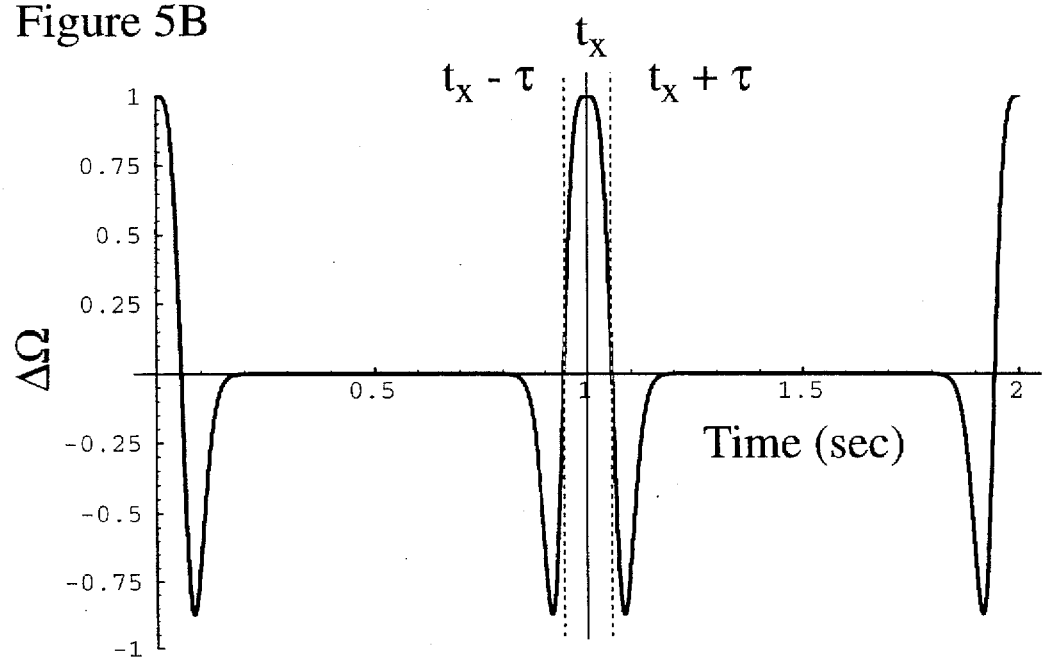

FIG. 5 summarizes the effect of this adjustment. Finally, because events may not occur on every cycle of the input, it is often useful to allow Ω (and therefore γ, c.f. Equation 4) to decay. This is because when the estimate of current period is slightly off, and the current cycle has no event, then τ may need to increase in order to find the event on a subsequent cycle. In the algorithm below, τ and γ are calculated from Ω. It is possible to define the function $g(\phi_i, \gamma_i)$ (c.f. Equation 4) directly, and mathematically this is more parsimonious. We have chosen this method of explication, however, because it illustrates how γ estimates variability in the pseudo-periodic component being tracked.

Implementation

The invention provides a method for analyzing a rhythmic pattern as a set of pseudo-periodic components. We have described the method in functional terms, that is, as a discrete circle map. This method could clearly be implemented in a number of different ways. It could, for example, be implemented in either hardware or software. Additionally, the structure that implements the method need not precisely implement the coupling functions we have provided, but simply implement such adaptive behavior in a nonlinear oscillator.

In particular, it is possible to modify the coupling to handle events that are not discrete, but have shape and extent in time. The coupling functions above are derived based upon a gradient descent strategy. An error function is defined that measures the difference between when the oscillator "expects" an event to occur and when events actually do occur. The coupling functions are then based upon the first derivative (phase and period) and second derivative (gain) of the error function. It is important, however, that the phase and period are tracked in such a way that only those events that fall within a temporal receptive field affect the behavior of the oscillator. Definition of the error function must take this into account.

An Efficient Algorithm

If we assume (as above), however, that events and changes to the oscillator's state variables are discrete, then there is an efficient algorithm to calculate the oscillator's behavior.

for $\tau$ from 0 to end-of-signal if ($s(t) > 0$) then $$t_x \leftarrow t_x + \eta_1 \frac{p}{2\pi} \text{sech}^2\gamma(\cos2\pi\phi - 1)\sin2\pi\phi;$$

$$p \leftarrow p + \eta_2 \frac{p}{2\pi} \text{sech}^2\gamma(\cos2\pi\phi - 1)\sin2\pi\phi;$$

$$\Omega \leftarrow \Omega + \eta_3\text{sech}^2\gamma(\cos2\pi\phi - 1)(\cos2\pi\phi +$$

$$2\gamma\tanh\gamma(\cos2\pi\phi - 1)\sin^2 2\pi\phi);$$

$$\tau \leftarrow \tau_{max} + 0.5(\tau_{min} - \tau_{max})(1 + \tanh\Omega);$$

$$\gamma \leftarrow \frac{\omega}{\cos2\pi\tau - 1} \; ;$$

endif;
if ($t = t_x$) then
$t_x \leftarrow t_x + p;$
decay $\Omega;$/* see code in appendix
[for one way to do this] or Equation 5*/
emit a beat;
endif;

Here, $t_x$ is (absolute) phase, $\phi$ is relative phase, p is period, $\gamma$ is gain ($\tau$ and $\Omega$ are related parameters, see above). The factor s(t) can be added to the one or more of the coupling functions if it is used to carry amplitude information. In this case the amount of adjustment is scaled. However if we assume that s(t)=1 at an event, its presence in the formula is redundant.

The floating point operations inside the first conditional are executed only when a signal impulse is present, and inside the second conditional when each oscillator fires. Hence, we have a very efficient algorithm, clearly realizable in software in real time. The running time is linear in the number of events, with constant determined by the period of the oscillator. In the examples that follow, this algorithm, with added interactions between oscillators, was used to calculate the output. The appendix gives 'c' programs for performing the important calculations.

Network Design and Interaction Among Oscillators

Figure 6:
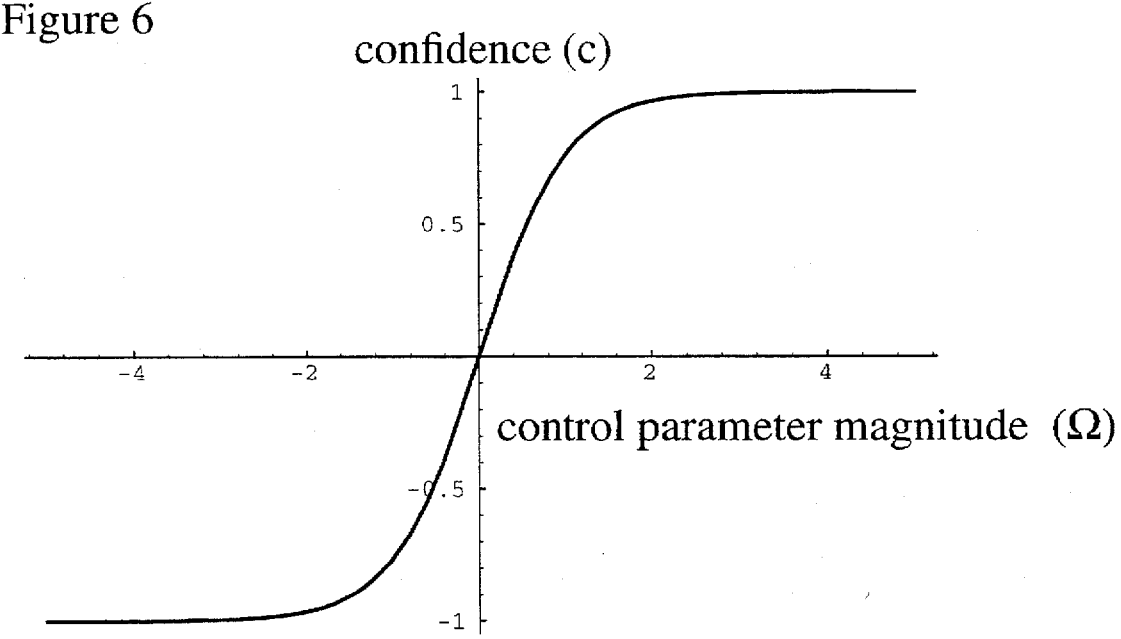
FIG. 6 illustrates a possible relationship between $\Omega$ and c, according to Equation 12. This provides one way for the oscillator to measure confidence.
Figure 7A:
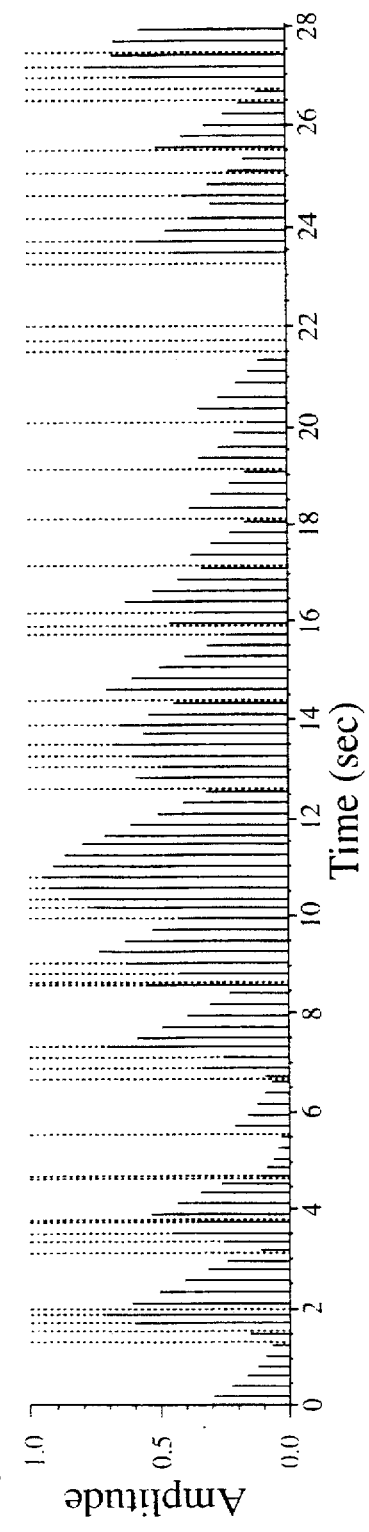
FIGS. 7A, 7B, 7C, 7D, show the response of two oscillators to rhythmic input from a melody improvised on piano. The input events (dotted lines) and reference periodicities (solid lines) are shown for Oscillators 1 and 2 in FIGS. 7A and 7C, respectively. The periods of Oscillators 1 and 2 are shown in FIGS. 7B and 7D, respectively.
Figure 7B:
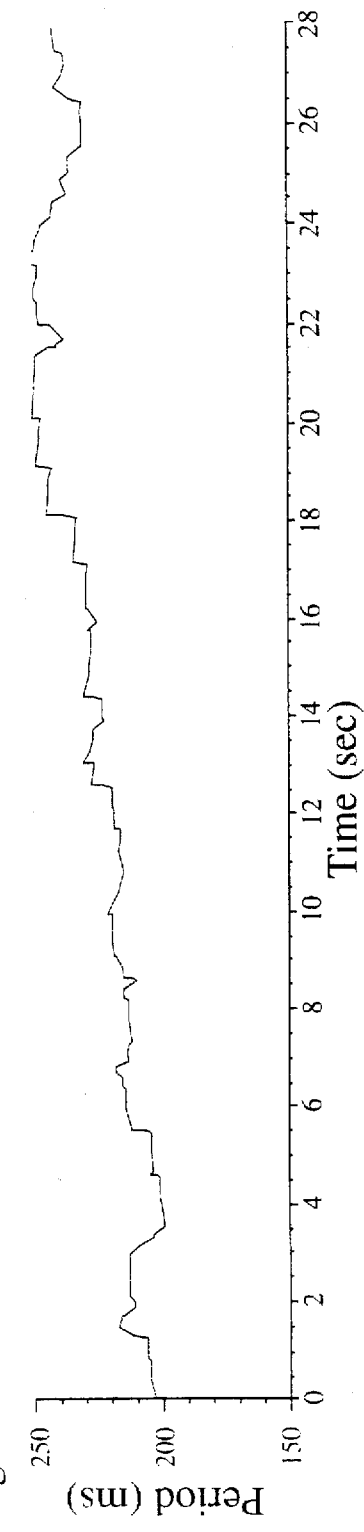
Figure 7C:
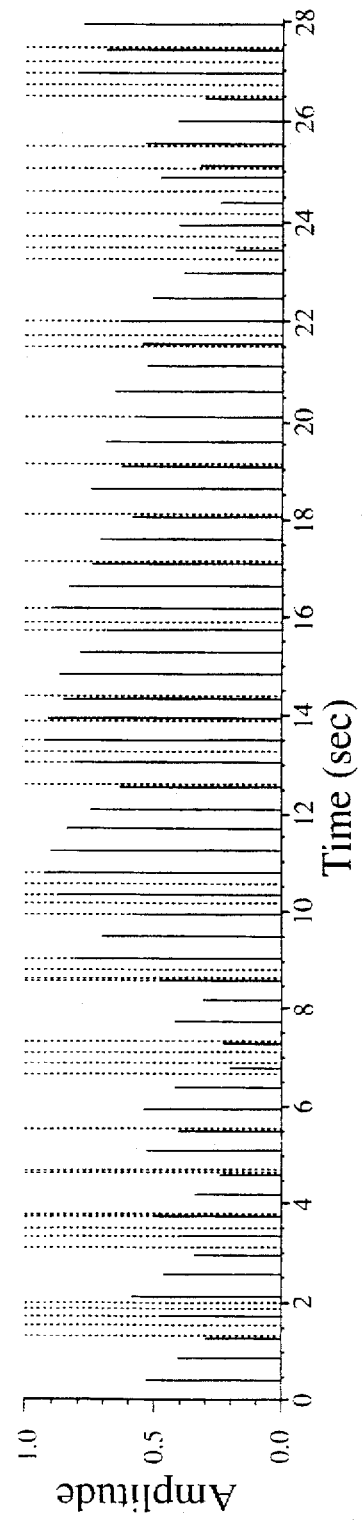
Figure 7D:
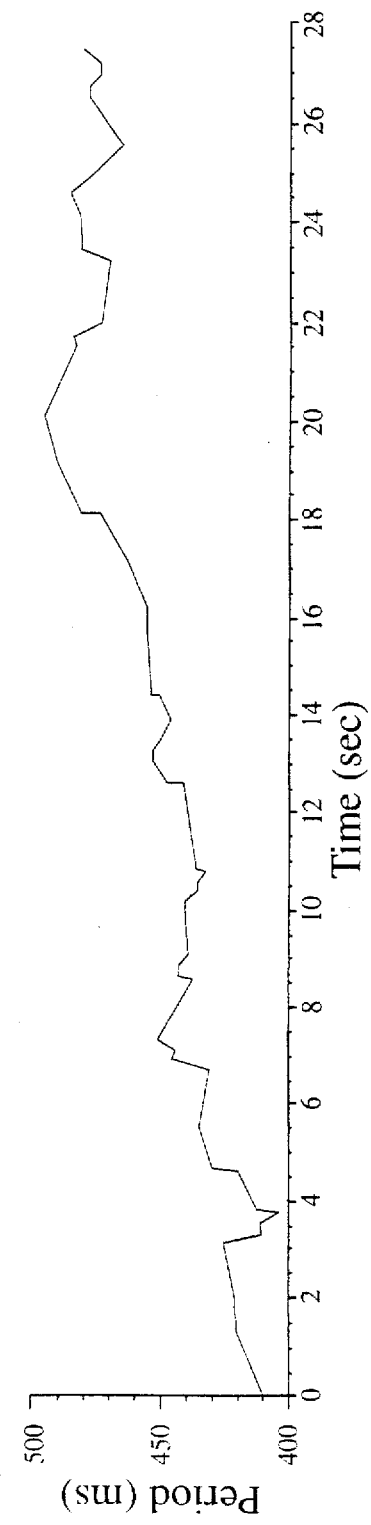
Figure 8A:
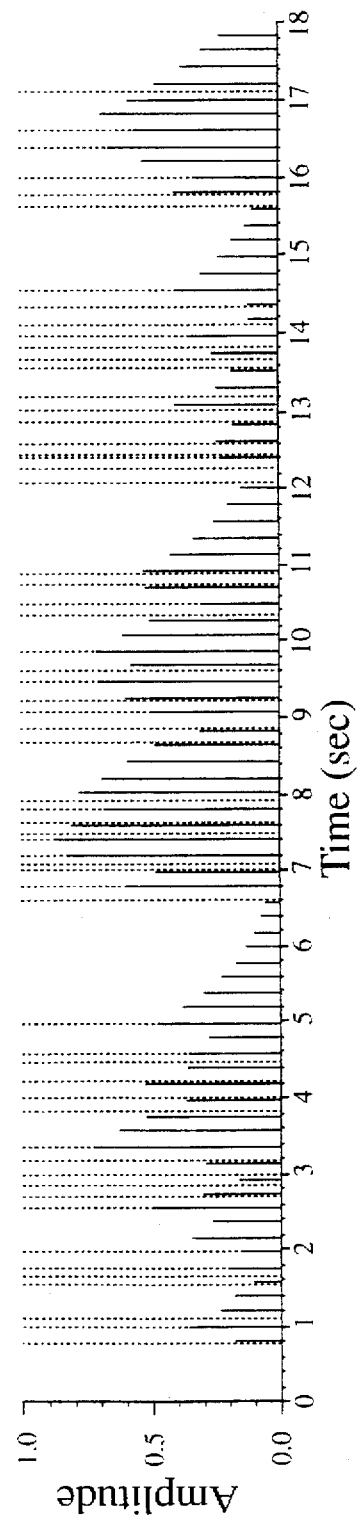
FIGS. 8A, 8B, 8C, and 8D show the response of two oscillators to rhythmic input from a digital sample of read speech. The digital sample was filtered using an onset detection algorithm, and the results of the onset detection algorithm were used as input. The input events (dotted lines) and output beats (solid lines) are shown for Oscillators 1 and 2 in FIGS. 8A and 8C, respectively. The periods of Oscillators 1 and 2 are shown in FIGS. 8B and 8D, respectively.
Figure 8B:
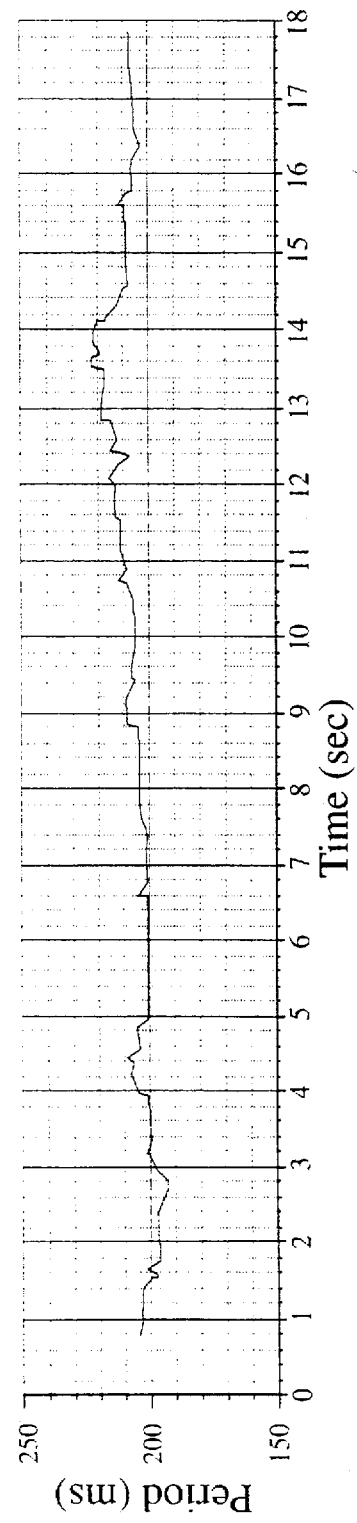
Figure 8C:
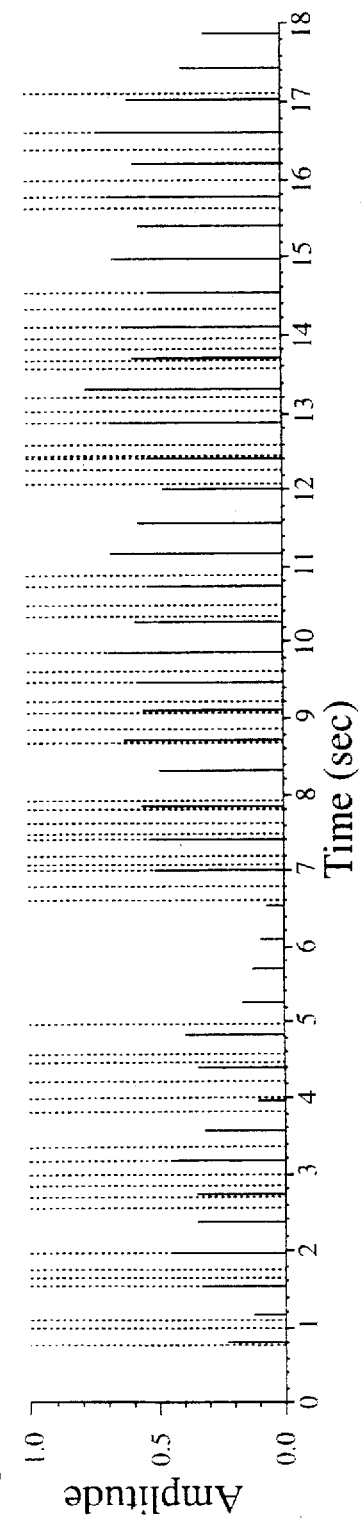
Figure 8D:
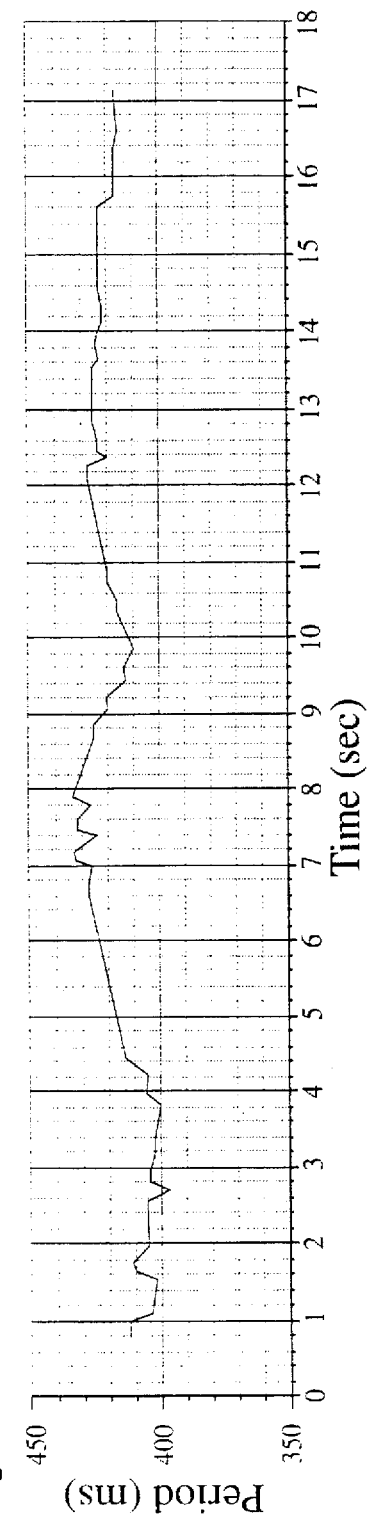
Figure 9:
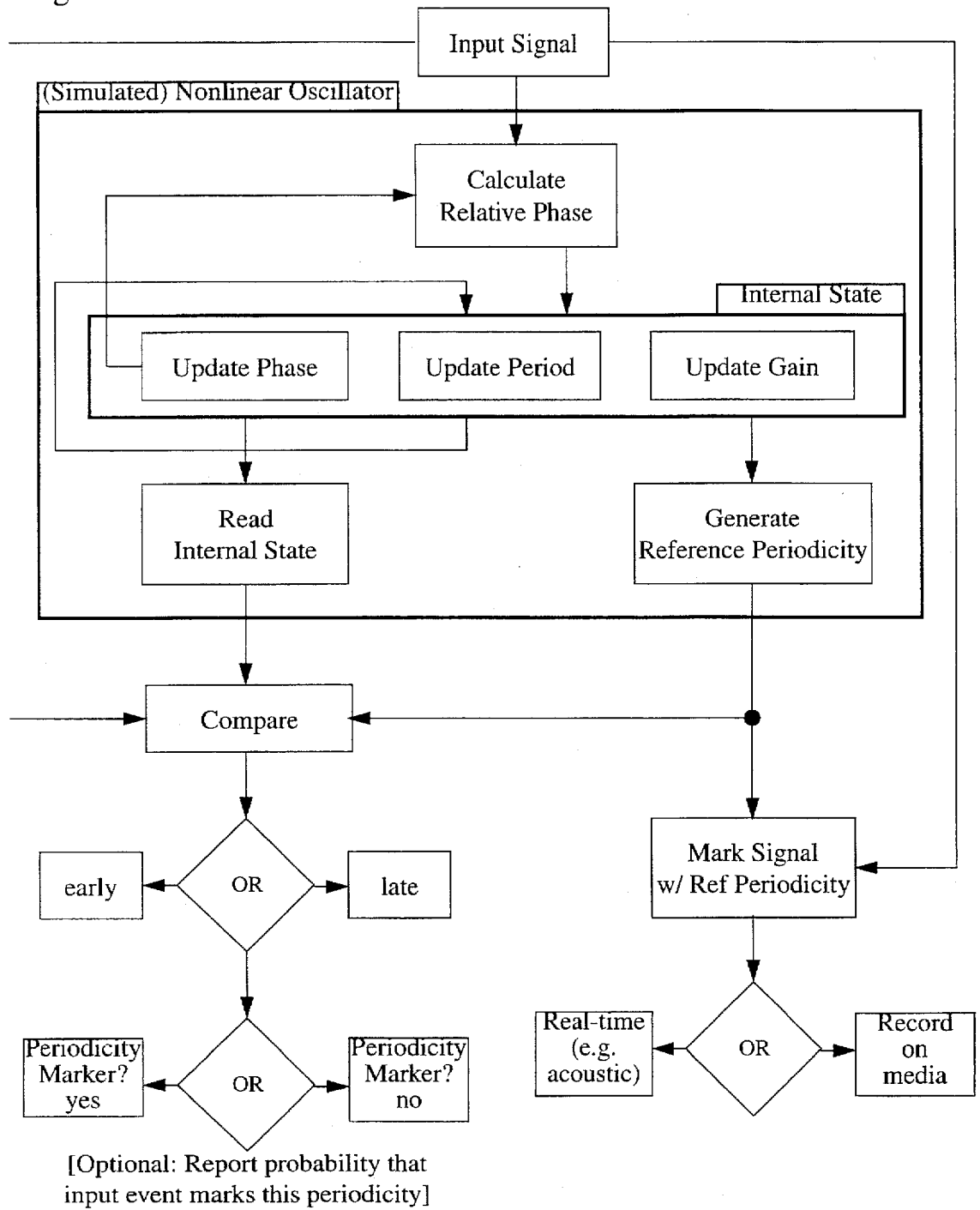
FIG. 9 is a flow diagram showing an embodiment of the present invention comprising one nonlinear oscillator.
Figure 10:
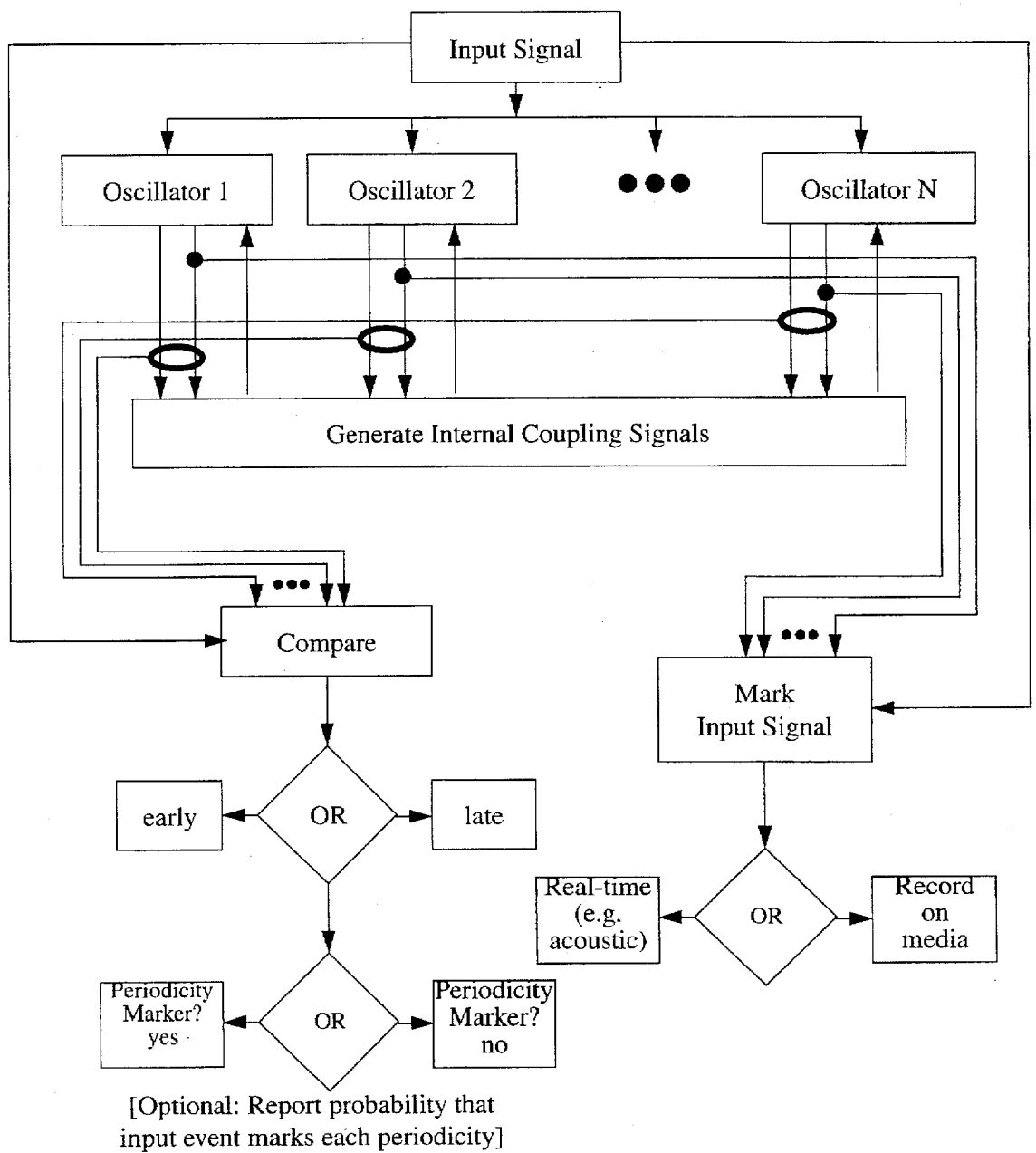
FIG. 10 is a flow diagram showing an embodiment of the present invention comprising multiple nonlinear oscillators.

For the examples that follow, we analyzed complex rhythmic signals using only two oscillators, to illustrate some of the basic principles involved in designing a network of oscillators to perform a metrical structure analysis. We used a two simple extensions to the basic invention. The first extension is that each oscillator provides a measure of its own "confidence". We let confidence be inversely related to $\tau$; that is, as variability shrinks, confidence grows. Thus we use the control parameter for $\tau$, but in a slightly different way, to control confidence (see FIG. 6):

$$c=c_{min}+0.5(c_{max}-c_{min})(1+\tanh\Omega). \qquad (12)$$

We allowed c to vary from $-1$ to $+1$. We may let the discrete reference periodicity (beats) have amplitude $$b(t)=c(t), \text{ when } t=t_x. \qquad (13)$$

Next we used interaction between oscillators in two forms. First, the two oscillators were internally coupled using their reference periodicities and internal state variables. This is a form of interaction between oscillators that is often useful. Internal coupling affected only phase and period, but not gain.

Second, each single unit is implemented as two oscillators (as described above), in tight, winner-take-all interaction. We refer to this arrangement as a compound unit. One oscillator, B, is constrained to have the same period as the other, A, but to remain exactly 180 degrees out of phase. At any given time, A's confidence is greater than B's. The oscillator with the greatest confidence, A, controls the phase and period adjustments. Additionally, only oscillator A generates the reference periodicity. However, both oscillators (A and B) measure variability and confidence. When B's confidence grows greater than oscillator A's confidence, the two oscillators switch roles. The observed behavior of a compound unit in such a situation is a sudden 180 degree phase shift.

Many types of interaction between oscillators are possible (e.g. Rand, Cohen, & Holmes, 1992). In general, the design of a network of oscillators—including the nature and magnitude of the interactions between oscillators—reflects assumptions about the nature of the signals to be analyzed. Hence network design is domain dependent. We do not describe any further network design strategies in this statement.

Example of Rhythmic Input

In this section, we show the response of two compound units to complex temporal patterns. We exposed a system of oscillators to a performed musical rhythm, and to the rhythm of read speech. We demonstrate how individual oscillators can isolate and track component periodicities in complex, non-stationary rhythms. Simple interactions between oscillators may be used to enforce constraints on the relationships between pseudo-periodic components.

First, we exposed two oscillators to a time-series of events from a melody improvised on piano. This performance was collected on a computer-monitored Yamaha Disklavier acoustic upright piano. Optical sensors and solenoids in the piano allowed precise recording and playback without affecting the touch or sound of the acoustic instrument. The pitch, timing, and hammer velocity values (correlated with intensity) for each note event were recorded. The recording yielded a list of MIDI events, from which we extracted note-on times only to use as input events. FIG. 7 shows the response of the oscillator to this input. In this example, the reference periodicity of Oscillator 1 correspond to sixteenth notes, Oscillator 2's reference periodicity corresponds to eighth notes. The reference periodicities provide the type of information necessary for transcribing this musical piece, for providing real-time accompaniment, or for other tasks requiring a computer program to follow the rhythm of the live performer.

Next, we exposed the same two oscillators to a time-series of events from a digitally sampled acoustic signal of read speech. The signal was reduced to a series of events using an onset detection algorithm. The onset detection algorithm found the onsets of events that corresponded to syllables, marking most, but not all of the syllables in the spoken excerpt. Except for the fact that it missed some syllable onsets, it did not differentiate between stressed and unstressed syllables. FIG. 8 shows the response of the oscillators to this input. By examining the output of the two oscillators, it can be seen that the rhythm of the speech is somewhat more complex than the rhythm of the music (above), yet the oscillators track two pseudo-periodic components with little difficulty. The reference periodicities provide the type of information necessary for time-warping in speech recognition, as well as information about systematic timing deviations, which may be useful in syntactic and semantic processing of the speech signal.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

We claim:

1. A method for the analysis of a stationary or non-stationary input signal provided as a time series susceptible to a frequency and phase analysis, to determine the presence and nature of a pseudo-periodic component in the signal, comprising the steps of:

providing a nonlinear oscillator with time-varying internal state described by a set of state variables and generating a potentially non-stationary reference periodicity;

driving the nonlinear oscillator with the input signal, through linear or non-linear coupling, to do one or more of the group consisting of (1) adjusting the state variables that determine the phase of the nonlinear oscillator in such a way that the nonlinear oscillator becomes entrained to said pseudo-periodic component, (2) adapting the state variables that determine the period of nonlinear oscillator according to systematic changes in the period of said pseudo-periodic component, in order to estimate the local period of said pseudo-periodic component, and (3) adapting the state variables that determine the gain of said nonlinear oscillator according to deviations of said pseudo-periodic component from the reference periodicity generated by said nonlinear oscillator, in order to estimate the local variability of said pseudo-periodic component; and reading the reference periodicity and/or internal state of said nonlinear oscillator throughout the analysis as the nonlinear oscillator adjusts its state variables.

2. The method of claim 1 in which a pseudo-periodic component is determined to exist in the input signal and the nature of said pseudo-periodic component is determined, said method further including the steps of:

reading the reference periodicity and/or internal state of said nonlinear oscillator throughout the analysis as the nonlinear oscillator adapts its internal state variables;

deriving from the reference periodicity and/or internal state of said nonlinear oscillator a measure of confidence in order to determine whether a pseudo-periodic component exists in the input signal; and comparing the reference periodicity and/or internal state of said nonlinear oscillator to the input signal to determine relative phase, frequency and/or variability of a pseudo-periodic component determined to exist in the input signal.

3. The method of claim 1 wherein said nonlinear oscillator is self-sustaining and is approximated by one or more of the group consisting of a limit cycle oscillator, a discrete circle map, and a set of finite difference equations.

4. The method of claim 1 further comprising the step of comparing the reference periodicity and/or internal state of said nonlinear oscillator to the input signal to determine whether a pseudo-periodic component exists in the input signal.

5. The method of claim 4 further comprising the step of comparing the reference periodicity and/or internal state of said nonlinear oscillator to the input signal to determine the nature of a pseudo-periodic component that has been determined to exist in the input signal.

6. The method of claim 5 further comprising the steps of:

using a reference periodicity generated by the nonlinear oscillator to generate a reference signal; and using said reference signal to mark the input signal in real-time and/or to mark the input signal off-line for further analysis.

7. The method of claim 6 wherein the step of using said reference signal to mark the input signal in real-time is to synchronize messages, whether auditory and/or visual, to the input signal in real time.

8. A method for the analysis of a stationary or non-stationary input signal provided as a time series of impulses susceptible to a frequency and phase analysis, to determine the presence and nature of multiple pseudo-periodic components in the input signal, comprising the steps of:

providing multiple nonlinear oscillators each with time-varying internal state described by a set of state variables, and generating a potentially non-stationary reference periodicity;

driving each nonlinear oscillator with the input signal, through linear or non-linear coupling, to do one or more of the group consisting of (1) adjusting the phase of each nonlinear oscillator in such a way that a subset of said nonlinear oscillators becomes entrained to the multiple pseudo-periodic components in the input signal, each of this subset corresponding to one of said pseudo-periodic components, (2) adapting the state variables that determine the period of each nonlinear oscillator according to systematic changes in the period of said corresponding pseudo-periodic component, in order to estimate the local period of said corresponding pseudo-periodic component, and (3) adapting the state variables that determine the gain of each nonlinear oscillator according to deviations of each pseudo-periodic component from the reference periodicity generated by its corresponding nonlinear oscillator, to estimate the variability of said corresponding pseudo-periodic component; and reading the reference periodicity and/or internal state of each individual nonlinear oscillator throughout the analysis as each individual nonlinear oscillator adjusts its state variables.

9. The method of claim 8 wherein said multiple nonlinear oscillators are connectable together.

10. The method of claim 9 wherein said nonlinear oscillators entrain to one another.

11. The method of claim 9 wherein the reference periodicity and/or internal state variables of one nonlinear oscillator are used as input to other nonlinear oscillators.

12. The method of claim 9 wherein a first nonlinear oscillator is constrained to have the same period as a second nonlinear oscillator and the second nonlinear oscillator is constrained to remain 180 degrees out of phase from the first nonlinear oscillator.

13. The method of claim 1 or 8 wherein a nonlinear oscillator adjusts its state variables only at certain points in said nonlinear oscillator's cycle, thereby isolating a pseudo-periodic component in the signal.

14. The method of claim 1 or 8 wherein a nonlinear oscillator determines a temporal receptive field within which said nonlinear oscillator responds to impulses in the input signal.

15. The method of claim 14 wherein a nonlinear oscillator entrains to the signal by adjusting its state variables only in response to impulses that occur within the temporal receptive field.

16. The method of claim 14 wherein the size of said temporal receptive field is adjustable by adapting the state variables that determine the nonlinear oscillator's gain.

17. The method of claim 14 wherein the size of said temporal receptive field is set by said nonlinear oscillator and the size is adjustable by said nonlinear oscillator based upon the amount of variability in the signal.

18. The method of claim 1 or 8 wherein a nonlinear oscillator determines its phase relative to the structure of the input signal.

19. The method of claim 8 wherein nonlinear oscillators have different phases and/or periods such that said nonlinear oscillators entrain essentially simultaneously to different pseudo-periodic components of the input signal.

20. The method of claim 1 or 8 wherein a nonlinear oscillator is driven with the input signal, through linear or non-linear coupling, said coupling being derivable from an error function similarly to a gradient descent procedure, and entrains to a pseudo-periodic component of the signal to track component periodicities of the input signal.

21. The method of claim 8 wherein said nonlinear oscillators are self-sustaining and are approximated by one or more of the group consisting of a limit cycle oscillator, a discrete circle map, and a set of finite difference equations.

22. The method of claim 8 in which a pseudo-periodic component is determined to exist in the input signal and the nature of said pseudo-periodic component is determined, said method further including the steps of:

reading the reference periodicity and/or internal state of said nonlinear oscillators throughout the analysis as the nonlinear oscillators adapt their internal state variables;

deriving from the reference periodicity and/or internal state of said nonlinear oscillators a measure of confidence in order to determine whether a pseudo-periodic component exists in the input signal; and comparing the reference periodicity and/or internal state of said nonlinear oscillators to the input signal to determine relative phase, frequency and/or variability of a pseudo-periodic component determined to exist in the input signal.

23. The method of claim 8 further comprising the step of comparing the reference periodicity and/or internal state of said nonlinear oscillator to the input signal to determine whether a pseudo-periodic component exists in the input signal.

24. The method of claim 23 further comprising the step of comparing the reference periodicity and/or internal state of each nonlinear oscillator to the input signal to determine the nature of the corresponding pseudo-periodic components that have been determined to exist in the input signal.

25. The method of claim 24 further comprising the steps of:

using the reference periodicities generated by the nonlinear oscillators to generate a set of reference signals; and using said reference signals to mark the input signal in real-time and/or to mark the input signal off-line for further analysis.

26. A method for determining the structure of a signal, comprising the steps of:

calculating the reference periodicity and internal state of a simulated nonlinear oscillator upon the occurrence of an impulse in the signal according to the algorithm:

for t from 0 to end-of-signal if $(s(t) > 0)$ then $$t_x \leftarrow t_x + \eta_1 \frac{p}{2\pi} \; \text{sech}^2\gamma(\cos2\pi\phi - 1)\sin2\pi\phi;$$

$$p \leftarrow p + \eta_2 \frac{p}{2\pi} \; \text{sech}^2\gamma(\cos2\pi\phi - 1)\sin2\pi\phi;$$

$$\Omega \leftarrow \Omega + \eta_3 \text{sech}^2\gamma(\cos2\pi\phi - 1) \, (\cos2\pi\phi +$$

$$2\gamma\tanh\gamma(\cos2\pi\phi - 1)\sin^2 2\pi\phi);$$

$$\tau \leftarrow \tau_{max} + 0.5(\tau_{min} - \tau_{max})(1 + \tanh\Omega);$$

$$\gamma \leftarrow \frac{\omega}{\cos2\pi\tau - 1} \; ;$$

endif;
if $(t = t_x)$ then
  $t_x \leftarrow t_x + p;$
  decay $\Omega$;/* see code in appendix for one way to do this */
  emit a beat;
endif;
endfor;

where $t_x$ is (absolute) phase, $\phi$ is relative phase, p is period and $\gamma$ is gain, $\tau$ is the width of the pulse function (derived from $\gamma$), and $\Omega$ is a control variable comparing the input signal with the reference periodicity and/or internal state generated according to the algorithm; and producing a reference signal correlated with the input signal, and generated according to the algorithm.

27. An apparatus for the analysis of a stationary or non-stationary input signal provided as a time series susceptible to a frequency and phase analysis, to determine the presence and nature of a pseudo-periodic component in the signal, comprising:

a nonlinear oscillator with time-varying internal state described by a set of state variables, and generating a potentially non-stationary reference periodicity;

means for driving the nonlinear oscillator with the input signal, through linear or non-linear coupling, to do one or more of the group consisting of (1) adjusting the state variables that determine the phase of the nonlinear oscillator in such a way that the nonlinear oscillator becomes entrained to said pseudo-periodic component, (2) adapting the state variables that determine the period of said nonlinear oscillator according to systematic changes in the period of said pseudo-periodic component, in order to estimate the local period of said pseudo-periodic component, and (3) adapting the state variables that determine the gain of said nonlinear oscillator according to deviations of said pseudo-periodic component from the reference periodicity generated by said nonlinear oscillator, in order to estimate the local variability of said pseudo-periodic component;

means for reading the reference periodicity and/or internal state of said nonlinear oscillator throughout the analysis as the nonlinear oscillator adjusts its state variables;

means for comparing the reference periodicity and/or internal state of said nonlinear oscillator to the input signal to determine whether a pseudo-periodic component exists in the input signal; and means for comparing the reference periodicity and/or internal state of said nonlinear oscillator to the input signal to determine the nature of a pseudo-periodic component that has been determined to exist in the input signal.

28. The apparatus of claim 27 further including means for using a reference periodicity generated by the nonlinear oscillator to generate a reference signal; and means for using said reference signal to mark the input signal in real-time and/or to mark the input signal off-line for further analysis.

29. An apparatus for the analysis of a stationary or non-stationary input signal provided as a time series susceptible to a frequency and phase analysis, to determine the presence and nature of multiple pseudo-periodic components in the input signal, comprising:

multiple nonlinear oscillators, each with time-varying internal state described by a set of state variables and generating a potentially non-stationary reference periodicity;

means for driving each nonlinear oscillator with the input signal, through linear or non-linear coupling, to do one or more of the group consisting of (1) adjusting the state variables that determine the phase of each nonlinear oscillator in such a way that a subset of said nonlinear oscillators becomes entrained to the multiple pseudo-periodic components in the input signal, each of this subset corresponding to one of said pseudo-periodic components, (2) adapting the state variables that determine the period of each nonlinear oscillator according to systematic changes in the period of said corresponding pseudo-periodic component, in order to estimate the local period of said corresponding pseudo-periodic component, and (3) adapting the state variables that determine the gain of each nonlinear oscillator according to deviations of each pseudo-periodic component from the reference periodicity generated by its corresponding nonlinear oscillator, to estimate the variability of said corresponding pseudo-periodic component;

means for reading the reference periodicity and/or internal state of each individual nonlinear oscillator throughout the analysis as each individual nonlinear oscillator adjusts its state variables;

means for comparing the reference periodicity and/or internal state of each nonlinear oscillator to the input signal to determine whether pseudo-periodic components exist in the input signal; and means for comparing the reference periodicity and/or internal state of each nonlinear oscillator to the input signal to determine the nature of the corresponding pseudo-periodic components that have been determined to exist in the input signal.

30. The apparatus of claim 29 wherein said multiple nonlinear oscillators are connectable together.

31. The apparatus of claim 30 wherein said nonlinear oscillators entrain to one another.

32. The apparatus of claim 30 wherein the reference periodicity and/or internal state variables of one nonlinear oscillator are used as input to other nonlinear oscillators.

33. The apparatus of claim 30 wherein a first nonlinear oscillator is constrained to have the same period as a second nonlinear oscillator and the second nonlinear oscillator is constrained to remain 180 degrees out of phase from the first nonlinear oscillator.

34. The apparatus of claim 27 or 29 wherein a nonlinear oscillator adjusts its state variables only at certain points in said nonlinear oscillator's cycle, thereby isolating a pseudo-periodic component in the signal.

35. The apparatus of claim 34 wherein a nonlinear oscillator determines a temporal receptive field within which said nonlinear oscillator responds to impulses in the input signal.

36. The apparatus of claim 35 wherein a nonlinear oscillator entrains to the signal by adjusting its state variables only in response to impulses that occur within the temporal receptive field.

37. The apparatus of claim 35 wherein the state variables that determine the gain of a nonlinear oscillator are adjustable to change the size of said nonlinear oscillator's temporal receptive field.

38. The apparatus of claim 35 wherein the size of said temporal receptive field is set by said nonlinear oscillator and the size is adjustable by said nonlinear oscillator based upon the amount of variability in the signal.

39. The apparatus of claim 27 or 29 wherein a nonlinear oscillator determines its phase relative to the structure of the input signal.

40. The apparatus of claim 29 wherein said nonlinear oscillators have different phases and/or periods such that said nonlinear oscillators entrain essentially simultaneously to different pseudo-periodic components of the input signal.

41. The apparatus of claim 27 or 29 wherein a nonlinear oscillator is driven with the input signal through linear or non-linear coupling, said coupling being derivable from an error function, similarly to a gradient descent procedure, and entrains to a pseudo-periodic component of the signal to track component periodicities of the input signal.

42. The apparatus of claim 27 further including means for using the reference periodicities generated by the nonlinear oscillators to generate a set of reference signals; and means for using said reference signals to mark the input signal in real-time and/or to mark the input signal off-line for further analysis.

43. In an apparatus for the analysis of a non-stationary input signal provided as a series of events susceptible to a frequency and phase analysis, to determine the presence of pseudo-periodic components in the signal, the improvement in which a central processing unit controls the simulation of a nonlinear oscillator, calculating a reference periodicity and/or internal state with which the input signal is compared, and further producing a reference signal to mark the input signal, in accordance with the formula:

for t from 0 to end-of-signal if $(s(t) > 0)$ then $t_x \leftarrow t_x + \eta_1 \frac{p}{2\pi} \text{sech}^2 \gamma (\cos 2\pi\phi - 1) \sin 2\pi\phi;$ $p \leftarrow p + \eta_2 \frac{p}{2\pi} \text{sech}^2 \gamma (\cos 2\pi\phi - 1) \sin 2\pi\phi;$ $\Omega \leftarrow \Omega + \eta_3 \text{sech}^2 \gamma (\cos 2\pi\phi - 1)(\cos 2\pi\phi + 2\gamma \tanh\gamma(\cos 2\pi\phi - 1)\sin^2 2\pi\phi);$ $\tau \leftarrow \tau_{max} + 0.5(\tau_{min} - \tau_{max})(1 + \tanh\Omega);$ $\gamma \leftarrow \frac{\omega}{\cos 2\pi\tau - 1};$ endif;
if $(t = t_x)$ then
$t_x \leftarrow t_x + p;$
decay $\Omega;$/* see code in appendix for one way to do this */
emit a beat;
endif;
endfor.

where $t_x$ is (absolute) phase, $\phi$ is relative phase, p is period, $\gamma$ is gain, $\tau$ is the width of the pulse function (derived from $\gamma$), and $\Omega$ is a control variable.

* * * * *